United States Patent
Zhang et al.

(10) Patent No.: US 12,471,886 B2
(45) Date of Patent: Nov. 18, 2025

(54) FILTERING METHOD AND SYSTEM FOR ULTRASONIC IMAGING

(71) Applicant: WUHAN UNITED IMAGING HEALTHCARE CO., LTD., Hubei (CN)

(72) Inventors: Yaowen Zhang, Wuhan (CN); Yihui Da, Wuhan (CN)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 1 day.

(21) Appl. No.: 18/434,769

(22) Filed: Feb. 6, 2024

(65) Prior Publication Data

US 2024/0206851 A1 Jun. 27, 2024

Related U.S. Application Data

(63) Continuation of application No. PCT/CN2022/131156, filed on Nov. 10, 2022.

(30) Foreign Application Priority Data

Jan. 18, 2022 (CN) .......................... 202210052438.9

(51) Int. Cl.
*A61B 8/00* (2006.01)
*A61B 8/14* (2006.01)

(52) U.S. Cl.
CPC ................ *A61B 8/488* (2013.01); *A61B 8/14* (2013.01); *A61B 8/5207* (2013.01); *A61B 8/5223* (2013.01)

(58) Field of Classification Search
CPC .......... A61B 8/488; A61B 8/14; A61B 8/5207; A61B 8/5223; A61B 8/565; A61B 8/06;
(Continued)

(56) References Cited

U.S. PATENT DOCUMENTS 5,490,094 A 2/1996 Heimburger et al.
5,823,964 A 10/1998 Liu et al.
(Continued)

FOREIGN PATENT DOCUMENTS

CN 1561916 A 1/2005
CN 102871689 A 1/2013
(Continued)

OTHER PUBLICATIONS

International Search Report in PCT/CN2022/131156 mailed on Jan. 28, 2023, 8 pages.
(Continued)

*Primary Examiner* — Bo Joseph Peng
(74) *Attorney, Agent, or Firm* — METIS IP LLC

(57) ABSTRACT

The embodiments of the present disclosure disclose a filtering method and system for ultrasonic imaging. The method may include: obtaining a plurality of pulse Doppler echo signals, two adjacent pulse Doppler echo signals being distributed at intervals in a time domain; generating a plurality of discontinuous segments of IQ data by demodulating the plurality of pulse Doppler echo signals; for each segment of IQ data, performing first filtering on at least part of data points; and obtaining a segment of filtered IQ data by performing second filtering on the filtered data points and unfiltered data points; performing interpolation based on the plurality of segments of filtered IQ data; and generating a spectrum image based on the interpolated data.

20 Claims, 7 Drawing Sheets

(58) Field of Classification Search
CPC .......... A61B 8/5215; A61B 8/52; G06T 5/20; G06T 2207/10132
See application file for complete search history.

(56) References Cited

U.S. PATENT DOCUMENTS

| | | | |
|---|---|---|---|
| 6,123,672 A | 9/2000 | Miller et al. | |
| 6,126,604 A | 10/2000 | Bae | |
| 6,193,662 B1 * | 2/2001 | Hwang | G01S 7/52077 600/458 |
| 6,364,838 B1 | 4/2002 | Freiburger et al. | |
| 6,620,103 B1 * | 9/2003 | Bruce | G01S 7/52085 600/458 |
| 6,898,235 B1 * | 5/2005 | Carlin | H04B 1/001 342/147 |
| 7,713,198 B2 * | 5/2010 | Sato | A61B 8/06 600/455 |
| 2003/0229285 A1 * | 12/2003 | Simpson | G01S 7/52038 600/458 |
| 2005/0096544 A1 * | 5/2005 | Hao | G01S 7/52085 600/447 |
| 2005/0148875 A1 * | 7/2005 | Sato | A61B 8/06 600/453 |
| 2009/0257672 A1 | 10/2009 | Sullender | |
| 2012/0053461 A1 | 3/2012 | Li et al. | |
| 2012/0152021 A1 | 6/2012 | Ma et al. | |
| 2019/0029651 A1 | 1/2019 | Patil et al. | |
| 2019/0083066 A1 | 3/2019 | Guo et al. | |

FOREIGN PATENT DOCUMENTS

| | | |
|---|---|---|
| CN | 105919625 A | 9/2016 |
| CN | 111388011 A | 7/2020 |
| CN | 111513755 A | 8/2020 |
| CN | 114376606 A | 4/2022 |
| JP | 2002325767 A | 11/2002 |

OTHER PUBLICATIONS

Wang, Peidong et al., Design and Implementation of Projection-Initialized Wall Filter in Ultrasonic Imaging, Journal of Biomedical Engineering, 25(2): 300-303, 2008.

Hu, Zheng et al., Design and Functional Comparison of Wall Filters in the Color Doppler System, Progress in Modern Biomedicine, 9(15): 2974-2976, 2009.

Steinar BjÆRUM et al., Clutter Filter Design for Ultrasound Color Flow Imaging, IEEE Transactions on Ultrasonics, Ferroelectrics, and Frequency Control, 49(2): 204-216, 2002.

* cited by examiner

FILTERING METHOD AND SYSTEM FOR ULTRASONIC IMAGING

CROSS-REFERENCE TO RELATED APPLICATIONS

This specification is a continuation of International Application No. PCT/CN2022/131156, filed on Nov. 10, 2022, which claims priority of Chinese Patent Application No. 202210052438.9, filed on Jan. 18, 2022, the entire contents of which are hereby incorporated by reference in its entirety.

TECHNICAL FIELD

The present disclosure relates to the field of image diagnosis, and in particular to a filtering method and system for ultrasonic imaging.

BACKGROUND

A medical image refers to an image of target internal tissues and organs obtained by means of a medium that interacts with the human body or the experimental body in a non-invasive way. Medical images can assist physicians in the diagnosis and treatment of diseases. One of the ways to obtain medical images is ultrasonic imaging. Ultrasonic imaging utilizes ultrasonic beams to scan the human body and obtains images of the internal organs by receiving and processing reflected signals. There are many modes of ultrasonic imaging, among which the ultrasonic multi-synchronization mode can simultaneously display a B mode image, a C mode image, and a PW mode image, which is of great significance in real-time clinical diagnosis.

Therefore, it is desirable to provide a filtering method and system for ultrasonic imaging to improve the quality of raw data for ultrasonic imaging.

SUMMARY

One aspect of the embodiments of the present disclosure provides a filtering method for ultrasonic imaging. The method may include: obtaining a plurality of pulse Doppler echo signals, two adjacent pulse Doppler echo signals being distributed at intervals in a time domain; generating a plurality of discontinuous segments of IQ data by demodulating the plurality of pulse Doppler echo signals; for each segment of IQ data: performing first filtering on at least part of data points; obtaining a segment of filtered IQ data by performing second filtering on the filtered data points and unfiltered data points; and generating a spectrum image based on the plurality of segments of filtered IQ data.

In some embodiments, for each segment of IQ data, the performing filtering on at least part of data points may include: obtaining a data length T; and performing filtering on first T data points of the IQ data.

In some embodiments, the generating a spectrum image based on the plurality of segments of filtered IQ data may include: performing interpolation based on the plurality of segments of filtered IQ data; and generating the spectrum image based on the interpolated data.

In some embodiments, the filtering first T data points of the IQ data may include: obtaining an initialization filtering scheme of an infinite impulse response (IIR) filter; generating a filter matrix according to the initialization filtering scheme of the IIR filter and the data length T; and multiplying the filter matrix by the first T data points of the IQ data.

In some embodiments, the obtaining an initialization filtering scheme of an IIR filter may include: obtaining a sweep speed; and determining the initialization filtering scheme of the IIR filter based on the sweep speed.

In some embodiments, the determining the initialization filtering scheme of the IIR filter based on the sweep speed may include: determining a target initialization scheme from a plurality of candidate initialization schemes as the initialization filtering scheme of the IIR filter, wherein a calculation time of the target initialization scheme may be related to the sweep speed.

In some embodiments, the obtaining an initialization filtering of an IIR filter may include: determining the initialization filtering scheme of the IIR filter based on a size of a distribution interval of two adjacent pulse Doppler echo signals in the time domain; wherein the size of the distribution interval may be positively correlated with the calculation time corresponding to the initialization filtering scheme.

In some embodiments, the multiplying the filter matrix by the first T data points of the IQ data may be implemented through parallel computing.

In some embodiments, the initialization filtering scheme of the IIR filter may include one or more of zero initialization, step initialization, projection initialization, and exponential initialization.

In some embodiments, performing recursive filtering on the filtered data points and the unfiltered data points may include: performing infinite impulse response (IIR) filtering on the unfiltered data points by successively inputting the filtered data points and the unfiltered data points into the IIR filter.

In some embodiments, the data length T may be less than or equal to a length of each segment of IQ data.

In some embodiments, the two adjacent pulse Doppler echo signals may be respectively generated by two PW emission sequences, and a B sequence or a C sequence may be inserted between the two PW emission sequences.

Another aspect of the embodiments of the present disclosure provides a filtering system for ultrasonic imaging. The system may include: an echo signal obtaining module configured to obtain a plurality of pulse Doppler echo signals, two adjacent pulse Doppler echo signals being distributed at intervals in a time domain; a demodulation module configured to generate a plurality of discontinuous segments of IQ data by demodulating the plurality of pulse Doppler echo signals; a filtering module configured to: for each piece of IQ data: perform filtering on at least part of data points; and obtain a segment of filtered IQ data by performing recursive filtering on the filtered data points and unfiltered data points; a data interpolation module configured to perform interpolation based on the plurality of segments of filtered IQ data; and a spectrum image generation module configured to generate a spectrum image based the interpolated data.

In some embodiments, the filtering module may be further configured to obtain a data length T and perform filtering on first T data points of the IQ data.

In some embodiments, the filtering module may be further configured to: obtain an initialization filtering scheme of an IIR filter; generate a filter matrix according to the initialization filtering scheme of the IIR filter and the data length T; and multiply the filter matrix by the first T data points of the IQ data.

In some embodiments, the filtering module may be further configured to obtain a sweep speed and determine the initialization filtering scheme of the IIR filter based on the sweep speed.

In some embodiments, the filtering module may be further configured to determine a target initialization scheme from a plurality of candidate initialization schemes as the initialization filtering scheme of the IIR filter, wherein a calculation time of the target initialization scheme may be related to the sweep speed.

In some embodiments, the filtering module may be further configured to determine the initialization filtering scheme of the IIR filter based on a size of a distribution interval of the two adjacent pulse Doppler echo signals in the time domain. The size of the distribution interval may be positively correlated with the calculation time corresponding to the initialization filtering scheme.

In some embodiments, the multiplying the filter matrix by the first T data points of the IQ data may be implemented through parallel computing.

In some embodiments, the initialization filtering scheme of the IIR filter may include one or more of zero initialization, step initialization, projection initialization, and exponential initialization.

In some embodiments, the filtering module may be further configured to: perform IIR filtering on the unfiltered data points by successively inputting the filtered data points and the unfiltered data points into the IIR filter.

In some embodiments, the data length T may be less than or equal to a length of each segment of IQ data.

In some embodiments, the two adjacent pulse Doppler echo signals may be respectively generated by two PW emission sequences, and a B sequence or a C sequence may be inserted between the two PW emission sequences.

Another aspect of the embodiments of the present disclosure provides an image processing device, including at least one storage medium and at least one processor. The at least one storage medium may be configured to store computer instructions; and the at least one processor may be configured to execute the computer instructions to implement the filtering method for ultrasonic imaging.

Another aspect of the embodiments of the present disclosure provides a computer-readable storage medium storing computer instructions. After reading the computer instructions in the storage medium, a computer may execute the filtering method for ultrasonic imaging.

BRIEF DESCRIPTION OF THE DRAWINGS

The present disclosure will be further illustrated by way of exemplary embodiments, which will be described in detail with the accompanying drawings. These embodiments are non-limiting. In these embodiments, the same count indicates the same structure, wherein.

DETAILED DESCRIPTION

Figure 1:
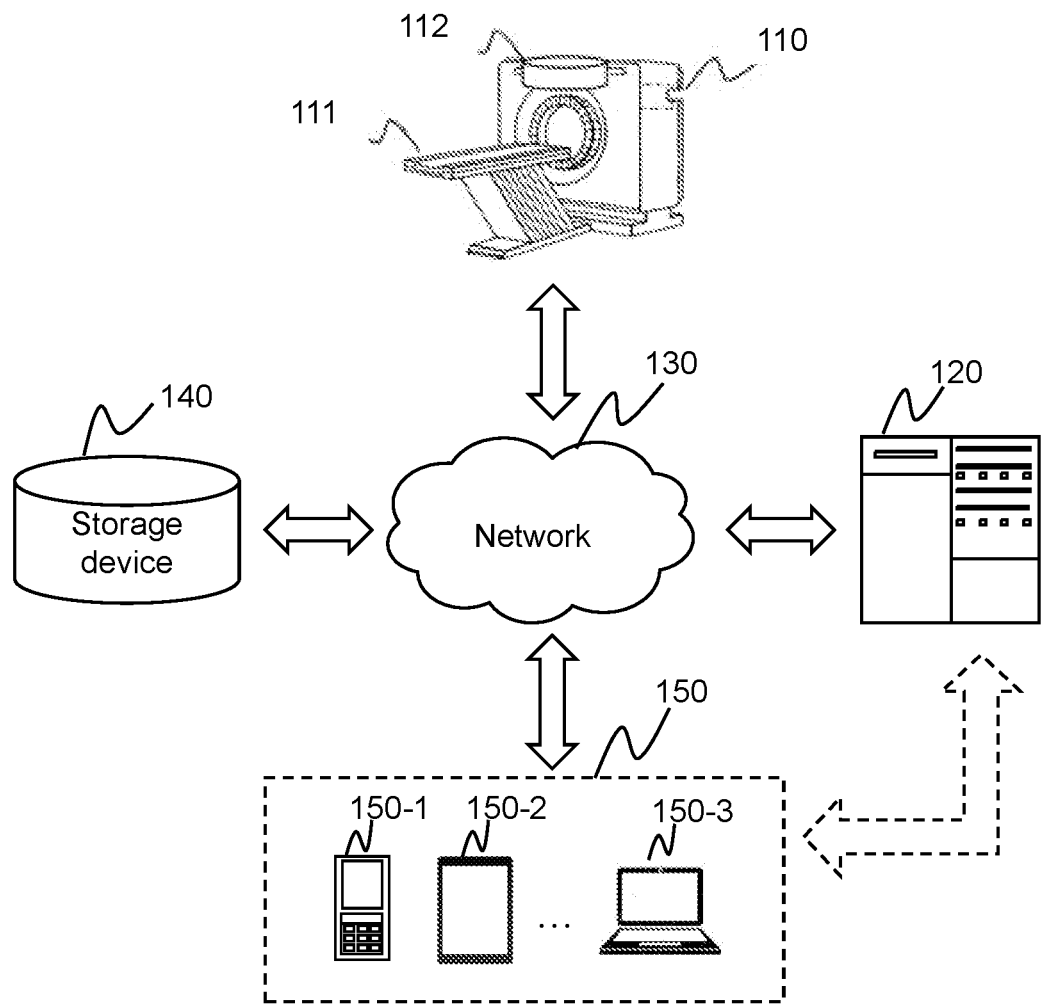
FIG. 1 is a schematic diagram illustrating an exemplary application scenario of filtering system for ultrasonic imaging according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system," "device," "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a," "an," and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

An ultrasonic multi-synchronization mode may simultaneously display a B mode image, a C mode image, and a PW mode image, which is of great significance in real-time clinical diagnosis. The PW mode is a common mode used in ultrasonic detection of a blood flow condition, such as a blood flow velocity and a blood flow direction. The basic processing flow is as follows: after a single ultrasonic transducer emits a set of pulse sequences, a blood flow echo signal of a specific depth may be received after a certain time delay. The echo signal may be firstly integrated and summed to increase a signal-to-noise ratio and then demodulated to obtain two orthogonal I and Q signals. Since the movement frequency of tissues such as blood vessel walls is much lower than that of blood flow, low-frequency components need to be filtered through a wall filter, i.e., a high-pass filter. For spectrum analysis, time-frequency analysis usually may be performed on a blood flow signal using the short-time Fourier transform. Finally, a spectrum image may be displayed on a screen. An audio signal may be directly obtained from a filtered IQ signal, or may be inversely transformed from the time-frequency analysis result, and finally played out through a loudspeaker after amplification and other processing. According to the Doppler principle, the blood flow velocity has a linear relationship with the Doppler frequency shift, and the calculation of the Doppler frequency shift is limited by the pulse repetition frequency (PRF). Theoretically, the higher the PRF, the higher the Doppler frequency shift that can be measured, i.e., the higher the upper limit of the blood flow velocity that can be measured. Although the high PRF can measure blood flow at a higher velocity, more data loss may also be brought to a PW spectrum image in the multi-synchronization mode.

The multi-synchronization mode containing PW refers to emitting B mode pulses or C mode pulses within an interval of emitting PW mode pulses, so as to perform a synchronous display of the PW mode, the B mode, or the C mode. In order to realize the multi-synchronization mode, an ultrasonic system may generally conduct scans in the B, C, and PW modes periodically by switching voltage and changing the emission sequences, and then obtain periodic echo signals in different modes. After the echo signals in different modes are obtained, the echo signals may be sent to imaging units of different modes after beamforming, and finally displayed on the screen, and a sound in the PW mode may be played. The multi-synchronization mode may be implemented in two ways. One way may be to insert only a small count of B or C mode emission sequences in the PW emission sequence. In this way, the PW emission sequence may have no defects, and the quality of a Doppler spectrum image may be relatively good, but a count of display frames in the B or C mode may limit the PRF of the PW mode, and thus the blood flow velocity that can be detected may be greatly reduced. Another way is to insert enough B or C sequences in the PW emission sequence, so that the image quality of the B or C mode may be relatively good without limiting the PRF, but this way may make the PW emission sequence too intermittent and discontinuous, and thus appropriate gap filling may be required for imaging.

When the PRF is low, a PW pulse repetition interval (PRI) may be long enough, and the B or C mode pulses may be inserted more conveniently without considering switching of emission voltage. The PW data processing at this time may be no different from that of a single PW mode. When the PRF is high, the PRI may be too short, the B or C mode pulses may not be inserted between two PW emission pulses, or the inserted B or C mode pulse sequences may be too small to display B or C mode images at a specified frame rate, and thus a part of PW emission pulses may be vacated for imaging in other modes. Due to the absence of emission pulses, the IQ data demodulated in the PW mode may be discontinuous. Segmental filtering of the discontinuous IQ data may result in missing or anomalous spectra. In order to solve the above problems, the upper limit of the PRF may be set in the multi-synchronization mode to avoid the problem of continuous vacancy of the PW emission pulse, so that the IQ data can be continuous. Although this method can perform multi-synchronous display, the limited PRF may weaken its ability to measure the blood flow velocity. Alternatively, the abnormality of the spectrum image may be reduced by using a filter with better performance such as an adaptive filter and a spectrum gap interpolation algorithm. This method may increase the computational complexity and the equipment cost.

Therefore, in the case of ultrasonic multi-synchronization and high PRF, the defective PW echo signals may need to be processed accordingly. A PW mode imaging unit may mainly be configured to perform orthogonal demodulation, wall filtering, gap filling, and spectrum analysis. The orthogonal demodulation has already been introduced in related technologies, and will not be repeated here. Wall filtering refers to high-pass filtering, which may filter out low-frequency signals of signals. The low-frequency signals may generally be motion information of blood vessel walls or tissues. Commonly used wall filters may include a finite impulse response (FIR) filter, an IIR filter, etc. In order to achieve a better filtering effect and suppress the low-frequency components, an order of the FIR filter may usually be very high, and a response time of the FIR filter may be equal to the order of the FIR filter, and thus the response time of the FIR filter may also be very high. The IIR filter may achieve a filtering effect similar to a high-order FIR filter with a smaller order, and a recursive implementation of the IIR filter may have a strong transient effect.

In order to balance the segmental filtering effect and the calculation cost, some embodiments of the present disclosure provide a filtering method of matrix multiplication, which can convert a commonly used high-pass filter into a constant square matrix, thereby speeding up the calculation. Commonly used filters may include but are not limited to an IIR filter, an FIR filter, etc. In addition, for the IIR filter, the transient effect of the IIR filter may also be weakened to a certain extent according to different initialization schemes, and the IQ data obtained by filtering may not be much different from the original non-defective filtered IQ data, thereby providing high-quality raw data for IQ data interpolation or spectrum gap filling. The following describes the technical solutions disclosed in the present disclosure in detail through the description of the accompanying drawings.

FIG. 1 is a schematic diagram illustrating an exemplary application scenario of a filtering system for ultrasonic imaging according to some embodiments of the present disclosure.

As shown in FIG. 1, a filtering system 100 for ultrasonic imaging may include an ultrasonic imaging device 110, a processing device 120, a network 130, a storage device 140, and a terminal 150. In some embodiments, the ultrasonic imaging device 110, the processing device 120, the network 130, the storage device 140, and the terminal 150 may be connected to and/or communicate with each other in a wired and/or wireless manner.

The ultrasonic imaging device 110 may be configured to obtain ultrasonic imaging data of a target region on an object. In some embodiments, the ultrasonic imaging device may obtain the ultrasonic imaging data of the target region on the object by using physical characteristics of ultrasonic waves and a difference of the target region on the object in acoustic properties. The ultrasonic imaging data may display and/or record features associated with the target region on the object in the form of waveforms, curves, or images. Merely by way of example, the ultrasonic imaging device may include one or more ultrasonic probes configured to emit ultrasonic waves to the target region (e.g., the target region may be an object located on a treatment bed 111 or an organ or tissue thereof). The ultrasonic waves may produce different reflections and attenuation after passing through organs and tissues with different acoustic impedances and different attenuation characteristics, thereby forming echoes that can be received by the one or more ultrasonic probes. The ultrasonic imaging device may generate the ultrasonic imaging data by processing (e.g., amplifying or converting) and/or displaying the received echoes. In some embodiments, the ultrasonic imaging device may include a B-ultrasonic device, a color Doppler ultrasonic device, a cardiac color ultrasonic device, a three-dimensional color ultrasonic device, or the like, or any combination thereof. In some embodiments, the ultrasonic imaging data may be pulse Doppler echo signals.

In some embodiments, the ultrasonic imaging device 110 may send the ultrasonic imaging data to the processing device 120, the storage device 140, and/or the terminal device 150 through the network 130 for further processing. For example, the ultrasonic imaging data obtained by the ultrasonic imaging device may be non-image data, and the non-image data may be sent to the processing device 120 for generating an ultrasonic spectrum image. As another example, the ultrasonic imaging data obtained by the ultrasonic imaging device may be image data, and the image data may be sent to the terminal device 150 for display. As another example, the ultrasonic imaging data may be stored in the storage device 140.

In some embodiments, the ultrasonic imaging device 110 may further include other imaging devices 112. In some embodiments, the other imaging devices 112 may include an X-ray imaging device, a magnetic resonance imaging device, a nuclear medicine device, a thermal imaging device, a medical optical device, or the like, or any combination thereof.

The processing device 120 may process data and/or information obtained from the ultrasonic imaging device 110, the storage device 140, and/or the terminal 150. For example, the processing device 120 may process ultrasonic imaging data obtained from an imaging device of the ultrasonic imaging device 110 and generate an ultrasonic image of the target region. In some embodiments, the ultrasonic image may be sent to the terminal 150 and displayed on one or more display devices of the terminal 150. In some embodiments, the processing device 120 may be a single server or a server group. The server group may be centralized or distributed. In some embodiments, the processing device 120 may be local or remote. For example, the processing device 120 may access the information and/or data stored in the ultrasonic imaging device 110, the storage device 140, and/or the terminal 150 via the network 130. As another example, the processing device 120 may be directly connected to the ultrasonic imaging device 110, the storage device 140, and/or the terminal 150 to access the information and/or the data stored therein. As another example, the processing device 120 may be integrated in the ultrasonic imaging device 110. In some embodiments, the processing device 120 may be implemented on a cloud platform. Merely by way of example, the cloud platform may include a private cloud, a public cloud, a hybrid cloud, a community cloud, a distributed cloud, an internal cloud, a multi-cloud, or the like, or any combination thereof.

In some embodiments, the processing device 120 may be a single processing device that communicates with the ultrasonic imaging device and processes data received from the ultrasonic imaging device.

The network 130 may include any suitable network that may facilitate information and/or data exchange for the filtering system 100 for ultrasonic imaging. In some embodiments, one or more components (e.g., the ultrasonic imaging device 110, the processing device 120, the storage device 140, or the terminal 150) of the filtering system 100 for ultrasonic imaging may be connected to and/or communicate with other components of the filtering system 100 for ultrasonic imaging through the network 130. For example, the processing device 120 may obtain the ultrasonic imaging data from the ultrasonic imaging device 110 through the network 130. As another example, the processing device 120 may obtain user instructions from the terminal 150 through the network 130. The instructions may be used to instruct the ultrasonic imaging device 110 to perform imaging and/or radiotherapy. In some embodiments, the network 130 may include one or more network access points. For example, the network 130 may include a wired or wireless network access point, such as a base station and/or Internet access point, through which one or more components of the filtering system 100 for ultrasonic imaging may be connect to the network 130 for data and/or information exchange.

The storage device 140 may store data and/or instructions. In some embodiments, the storage device 140 may store data obtained from the terminal 150 and/or the processing device 120. In some embodiments, the storage device 140 may store data or instructions that the processing device 120 performs or is used to perform the exemplary method described herein. In some embodiments, the storage device 140 may be implemented on a cloud platform. Merely by way of example, the cloud platform may include a private cloud, a public cloud, a hybrid cloud, a community cloud, a distributed cloud, an internal cloud, a multi-cloud, or the like, or any combination thereof.

In some embodiments, the storage device 140 may be connected to the network 130 to communicate with one or more components (e.g., the processing device 120, the terminal 150, etc.) of the filtering system 100 for ultrasonic imaging. The one or more components of the filtering system 100 for ultrasonic imaging may access the data or the instructions stored in the storage device 140 through the network 130. In some embodiments, the storage device 140 may be directly connected to or in communication with the one or more components (e.g., the processing device 120, the terminal 150, etc.) of the filtering system 100 for ultrasonic imaging. In some embodiments, the storage device 140 may be a part of the processing device 120.

The terminal 150 may include a mobile device 150-1, a tablet 150-2, a laptop 150-3, or the like, or any combination thereof. In some embodiments, the terminal 150 may operate the ultrasonic imaging device 110 remotely. In some embodiments, the terminal 150 may operate the ultrasonic imaging device 110 via a wireless connection. In some embodiments, the terminal 150 may receive information and/or instructions input by the user, and send the received information or instructions to the ultrasonic imaging device 110 or the processing device 120 through the network 130. In some embodiments, terminal 150 may receive data and/or information from the processing device 120. In some embodiments, the terminal 150 may be a part of the processing device 120. In some embodiments, the terminal 150 may be omitted.

Figure 2:
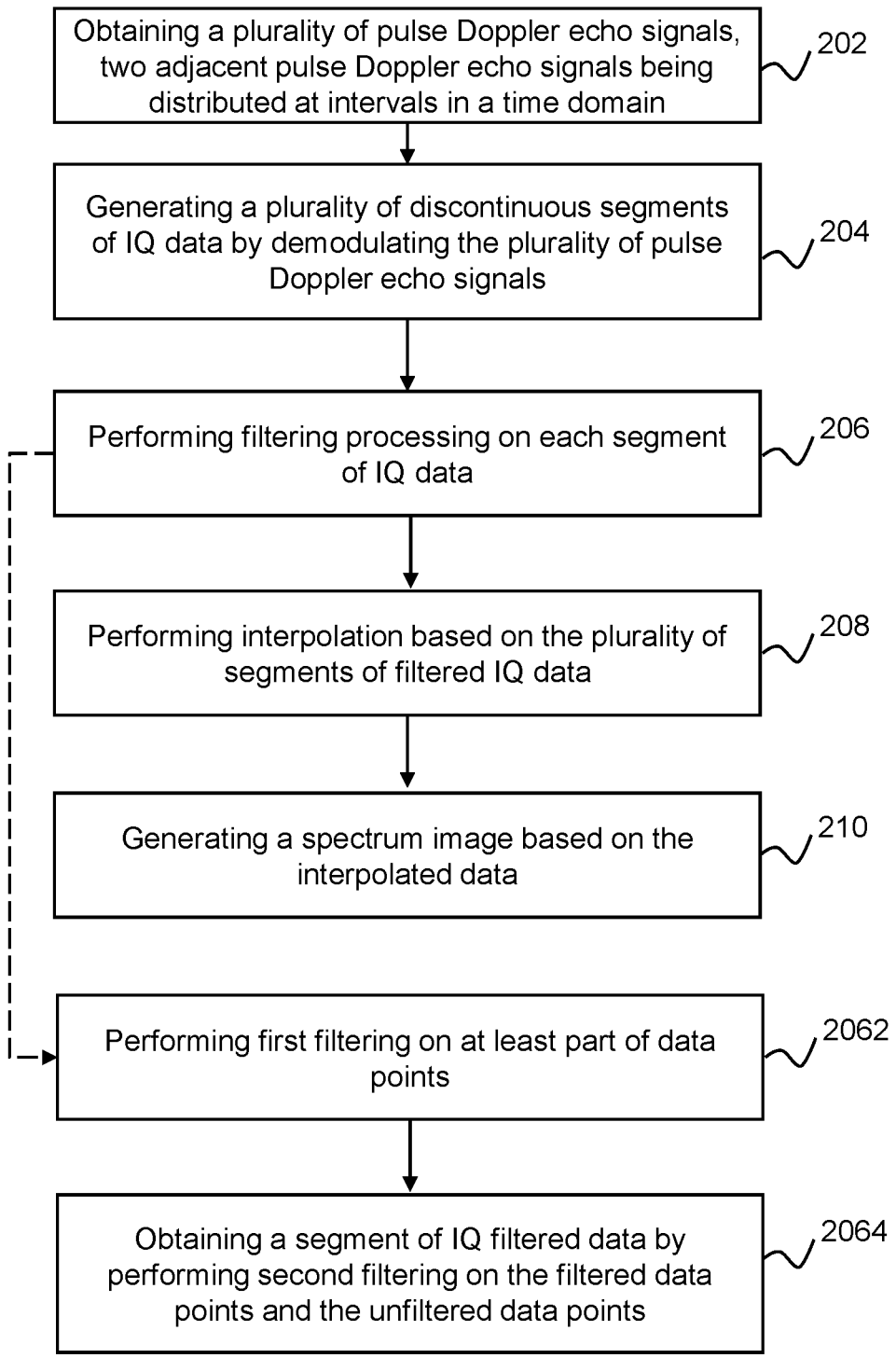
FIG. 2 is an exemplary flowchart illustrating a filtering method for ultrasonic imaging according to some embodiments of the present disclosure.

FIG. 2 is an exemplary flowchart illustrating a filtering method for ultrasonic imaging according to some embodiments of the present disclosure. In some embodiments, a process 200 may be performed by a processing device (e.g., the processing device 120). For example, the process 200 may be stored in a storage device (e.g., a built-in storage unit of the processing device or an external storage device) in the form of a program or an instruction, and may be implemented when the program or the instruction is executed. The process 200 may include the following operations.

In 202, a plurality of pulse Doppler echo signals may be obtained. Two adjacent pulse Doppler echo signals are distributed at intervals in a time domain. In some embodiments, operation 202 may be performed by an echo signal obtaining module 510.

A pulse Doppler echo signal refers to a signal returned after a certain time delay after an ultrasonic transducer emits a set of pulse sequences to a target object. The plurality of pulse Doppler echo signals may be returned echo signals received at different time periods. The two adjacent pulse Doppler echo signals being distributed at intervals in the time domain allows a sequence of any other mode, for example, a B sequence or a C sequence, to be inserted between the two adjacent pulse Doppler echo signals.

The target object may include a patient or any other medical experimental object (e.g., an experimental mouse or other animals), etc. The target object may also be a part of the patient or the other medical experiment object, including an organ and/or tissue, e.g., a heart, a lung, a rib, an abdominal cavity, or the like.

In some embodiments, the processing device may obtain the plurality of pulse Doppler echo signals by controlling an ultrasonic imaging device to emit pulse signals to the target object and receive the returned echo signals. For example, the two adjacent pulse Doppler echo signals may be respectively generated by two PW emission sequences, and a B sequence or a C sequence may be inserted between the two PW emission sequences.

In some embodiments, the processing device may also obtain the plurality of pulse Doppler echo signals by reading from a storage device or a database or calling a relevant data interface.

In some embodiments, in order to ensure that a frequency spectrum obtained by the subsequent processing has sufficient resolution, a length of each received echo signal may be greater than a preset value. The preset value may be set according to requirements. For example, the preset value may be set to 64 or above to adapt to a window size of the short-time Fourier transform (STFT).

In 204, a plurality of discontinuous segments of IQ data may be generated by demodulating the plurality of pulse Doppler echo signals. In some embodiments, operation 204 may be performed by a demodulation module 520.

In some embodiments, the processing device may demodulate the plurality of pulse Doppler echo signals through various common demodulation methods. For example, the processing device may perform demodulation through the orthogonal demodulation, which is not limited in the present disclosure.

The I of the IQ data refers to In-Phase, and the Q of the IQ data refers to Quadrature.

The demodulation may achieve the purpose of extracting Doppler frequency shift signals generated by tissues or blood flow in the body of the object from the echo signals.

The plurality of discontinuous segments of IQ data may refer that the plurality of segments of IQ data corresponding to the plurality of pulse Doppler echo signals obtained by demodulation is also discontinuous due to the plurality of pulse Doppler echo signals being distributed at intervals.

In some embodiments, after the pulse Doppler echo signals formed by combining discontinuous signals with equal intervals are demodulated, two orthogonal signals may form one complex signal. Any pulse Doppler echo signal may be represented by the following formula (1):

$$X_k = [x(t_0), x(t_0 + PRF), \ldots, x(t_0 + n*PRF)], k: \text{count of segments}, \quad (1)$$

where $X_k$ represents the k-th pulse Doppler echo signal, $t_0$ represents a time point at which data points of the pulse Doppler echo signal are received, and x represents the data point in the signal.

In 206, filtering processing may be performed on each segment of IQ data. In some embodiments, operation 206 may be performed by a filtering module 530.

Filtering processing may be understood as a process of extracting useful signals from the IQ data. For example, useless low-frequency signals of the IQ data may be removed through filtering processing, and useful frequency signals may be extracted. In ultrasonic signals, the low-frequency signals may generally be motion information of blood vessel walls, tissues, or the like. In some embodiments, the filtering is also referred to as digital filtering, which is a digital signal processing process of filtering an input signal through a numerical operation technique, and may be used as a basic processing technology in applications such as speech, image processing, pattern recognition, and spectrum analysis.

In some embodiments, the processing device may perform the filtering processing through a wall filter. For example, the filtering processing may be performed through a finite impulse response (FIR) filter, an infinite impulse response (IIR) filter, or the like.

In some embodiments, a process of wall filtering may be understood as performing a convolution operation on the pulse Doppler echo signals. Still using the above example, $X=[X_1, X_2, X_3, \ldots, X_k]$ represents the plurality of pulse Doppler echo signals, and using the m-order IIR filter to achieve the wall filtering in a recursive manner may be expressed by the following formula (2):

$$Y_k(n) = \sum_{m=0}^{m} b_m * X_k(n-m) - \sum_{m=1}^{m} a_m * Y_k(n-m), \quad (2)$$

where $Y_k(n)$ represents data after the wall filtering, $a_m$ and $b_m$ are coefficients of the filter, n represents a length of a segment of IQ data, m represents the order of the filter, $X_k(n-m)$ represents the previous (n–m) data points of the k-th signal, and $Y_k(n-m)$ represents the filtered data of the previous (n–m) data points of the k-th signal.

When the pulse Doppler echo signals are long, the filtering processing may be performed using the FIR filter or the IIR filter. When the pulse Doppler echo signals are short, the filtering processing may also be performed using the IIR filter, but a transient effect of the IIR filter may seriously affect the spectrum quality, and abnormal spectral lines and spectral interpolation may need to be discarded. In some embodiments, an initialization scheme of the IIR filter may be changed in combination with a state-space method to reduce the transient effect of the IIR filter, which is shown in the operations 2062-2064 hereinafter.

Since there are intervals among the plurality of pulse Doppler echo signals, the plurality of segments of IQ data obtained by demodulation may also be discontinuous. In order to avoid introducing redundant information, each segment of IQ data may be filtered during the filtering processing. For each segment of IQ data, the processing device may perform the filtering processing by repeatedly performing operations 2062-2064.

In 2062, first filtering may be performed on at least part of data points.

In some embodiments, the at least part of data points may be part of one segment of IQ data. For example, assuming that the IQ data has 96 data points, the IQ data may be divided into two parts, a first part may include 64 data points, and a second part may include 32 data points. The performing the first filtering on at least part of data points may be performing the filtering processing on the 64 data points of the first part.

In some embodiments, the processing device may obtain a data length T. The data length T refers to a count of data points that need to be filtered in the IQ data. For example, if a length of a segment of IQ data is n, only the first T data points may be selected for the filtering processing.

In some embodiments, the data length T may be input by a user, or may be a preset parameter read according to user input, or may be automatically generated by a system according to certain system parameters. For example, the user may directly input the data length T. As another example, the data length T may be used as an engineering parameter, which is input by an engineer as a preset parameter during design. The user may input a parameter option, and the processing device may read the preset parameter as the data length T. As another example, the processing device may automatically generate the data length T based on the length of each segment of IQ data according to the set parameters of the system. The length of the IQ data may be related to the magnitude of the data length T. For example, a mapping table between the length of the IQ data and the magnitude of the data length T may be established in advance, and the processing device may look up the mapping table based on the length of the IQ data, and automatically generate the data length T. The mapping table may reflect a relationship between the length of the IQ data and the data length T. For example, the longer the length of the IQ data, the larger the data length T. In some embodiments, the length of the IQ data may be related to a PRF parameter. For example, the larger the PRF parameter, the longer the IQ data. Similarly, a mapping table of a relationship between the PRF parameter and the IQ data may be established. Correspondingly, the processing device may look up and generate the corresponding data length T according to the mapping table based on a parameter input by the user, such as the PRF parameter or an IQ data parameter.

In some embodiments, the data length T may be less than or equal to the length of each segment of IQ data. For example, T may be less than n or equal to n.

The processing device may perform the first filtering on the first T data points of the IQ data based on the IIR filter. For example, the processing device may determine a filter matrix of the filter based on the data length T and the initialization scheme of the IIR filter, and then obtain filtered data by inputting the filter matrix and the first T data points into a matrix multiplication unit and multiplying the filter matrix by the first T data points. The descriptions regarding obtaining the filtered data by performing the first filtering on the first T data points may be found in FIG. 3 and relevant descriptions thereof, which are not repeated here.

In 2064, a segment of filtered IQ data may be obtained by performing second filtering on the filtered data points and the unfiltered data points.

Both the first filtering and the second filtering refer to filtering processing performed on data points. In some embodiments, the first filtering may be performed prior to the second filtering, i.e., the first filtering may be performed first, and then the second filtering may be performed. The first filtering and the second filtering may be the same or different. For example, both the first filtering and the second filtering may be matrix filtering. As another example, the first filtering may be matrix filtering, and the second filtering may be recursive filtering. In some embodiments, filtering algorithms corresponding to the first filtering and the second filtering may be the same or different. For example, the first filtering and the second filtering may both correspond to the IIR filter, or both may correspond to the FIR filter, or one of the first filtering and the second filtering may correspond to the IIR filter, and another of the first filtering and the second filtering may correspond to the FIR filter. It should be noted that in the embodiments of the present disclosure, the description that the first filtering is matrix filtering and the second filtering is recursive filtering is for the purpose of illustration only, and is not intended to limit the specific mode of the first filtering and the second filtering. Those skilled in the art can adjust the types and setting modes of the first filtering and the second filtering without making additional efforts if they understand the principle of the present disclosure, and these adjustments are all within the protection scope of the present disclosure.

Merely by way of example, the second filtering may include performing steady-state filtering on input data. Specifically, the processing device may input the filtered data points (e.g., the data points that have undergone the first filtering) and the unfiltered data points into a recursive computing unit to obtain a segment of filtered IQ data. An input mode may be successive input, i.e., the filtered data points and the unfiltered data points may be successively input into the IIR filter for IIR filtering.

In some embodiments, the processing device may stitch the filtered data points and the unfiltered data points. The filtering may be performed in such a way that the filtered data points may be input first and then the unfiltered data points may be input. This process can be understood as that the filtered T data points and the remaining n-T unfiltered data points may be recombined into n data points, and then IIR filtering may be performed on the regenerated n data points by the IIR filter. Then the IIR filter may discard the first T data points of n data after IIR filtering, and finally, the segment of filtered IQ data may be obtained by recombining (e.g., stitching) the data points (the data length is T) after the segmental filtering and the n-T data points after the IIR filtering.

For example, $Y_T$ represents the filtered data points and n-T represents the unfiltered data points. $Y_T$ and the last n-T data points of the IQ data may be successively input into the recursive computing unit for steady-state filtering, so as to ensure that a recursive computing speed is faster than a display speed of each spectral line. The recursive computing unit may obtain results of all points of IQ segmental filtering through continuous convolution operations. In some embodiments, a process of recursive filtering may be expressed by the following formula (3):

$$Y_k = \sum_{m=0}^{m} b_m * X_t(n-T-m) - \sum_{m=1}^{m} a_m * Y_t(n-T-m) + Y_T, \quad (3)$$

where $Y_k$ represents an output after the recursive filtering, $Y_T$ represents the filtered data points, $a_m$ and $b_m$ are coefficients of the filter, $X_t$ represents the t-th segment of echo signals, and $Y_t$ represents a filtering result of the t-th segment of echo signals.

For example, assuming that the length of a segment of IQ data is 128, and the data length T=20, an output y1, y2, y3 . . . y20 may be obtained by performing filtering on the first T data points, i.e., the (1-20)-th data points using the matrix parallel multiplication. When performing the subsequent recursive filtering, the filtered data points $Y_T$ and the last n-T unfiltered data points may be successively input into the IIR filter for IIR filtering.

In some embodiments, the processing device may input the filtered data points and the unfiltered data points into the matrix computing unit, and obtain the segment of filtered IQ data through matrix filtering. A filter matrix used in the first filtering may be the same as or different from the filter matrix used in the second filtering. For example, the filter matrix used in the first filtering and the filter matrix used in the second filtering may be converted from different filters (e.g., the IIR filter, the FIR filter, etc.). A specific computing mode of the matrix computing unit may adopt various known modes, which are not limited in the present disclosure.

In 208, interpolation may be performed based on the plurality of segments of filtered IQ data. It should be noted that in some embodiments, the filtered IQ data may be IQ data obtained after the first filtering and/or the second filtering. In some embodiments, operation 208 may be performed by a data interpolation module 540.

The interpolation refers to performing interpolation supplementation to the missing of the filtered IQ data points.

In some embodiments, the processing device may perform the interpolation on the plurality of segments of filtered IQ data under a preset situation. The preset situation may include that a time interval between two adjacent PW emission lines is too short to insert emission lines of other modes (e.g., a B mode, or a C mode), or the PRF is too high (e.g., higher than a preset value). When not in the preset condition, the processing device may not perform the interpolation on the plurality of segments of filtered IQ data, but directly generate a spectrum image based on the plurality of segments of filtered IQ data.

In some embodiments, the processing device may perform the interpolation based on various common interpolation techniques. For example, the processing device may use a technique of filling a gap by windowing and splicing the front and rear sections of the gap, a technique of filling a gap using reverse conjugate addition of the front and rear sections of the gap, a spectral line spline interpolation technique, etc., which are not limited in the present disclosure.

In 210, a spectrum image may be generated based on the interpolated data. In some embodiments, operation 210 may be performed by a spectrum image generation module 550.

In some embodiments, the processing device may generate the spectrum image based on the interpolated data through various common ultrasonic spectrum image generation techniques. For example, the processing device may multiply the interpolated data by a window function, then perform the Fourier transform on the multiplied data to obtain a frequency domain signal, and finally obtain the spectrum image based on the frequency domain signal. The descriptions regarding the specific technique of generating the spectrum image may be found in the relevant technologies, which are not repeated here.

In some embodiments of the present disclosure, a processing speed may be accelerated by matching the data length of filtering and the dimension for initializing matrix. At the same time, different filter initialization schemes may also weaken the spectrum abnormality caused by the response time, thereby optimizing the processing flow. In the multi-synchronization mode, the PW echo signal defect caused by a high PRF may also be filtered through the technical solution disclosed in the embodiments of the present disclosure, and the obtained IQ filtered data may be less different from the original filtered data without defects, thereby providing high-quality raw data for subsequent spectrum gap filling, and then obtaining high-quality spectrum images.

In some embodiments, the processing device may first perform the interpolation processing on the obtained plurality of pulse Doppler echo signals, and then perform filtering using the filtering method for ultrasonic imaging shown in some embodiments of the present disclosure. In some embodiments, the processing device may also perform the interpolation processing on the obtained plurality of pulse Doppler echo signals, and perform filtering using a conventional filtering method before or after performing filtering using the filtering method for ultrasonic imaging shown in some embodiments of the present disclosure, which is not limited in the present disclosure.

Figure 3:
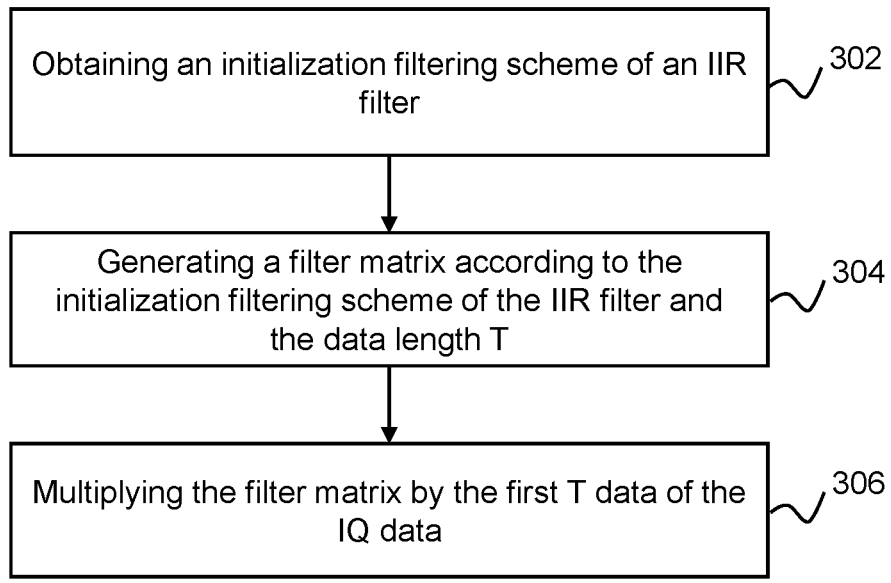
FIG. 3 is an exemplary flowchart illustrating filtering processing according to some embodiments of the present disclosure.

FIG. 3 is an exemplary flowchart illustrating a filtering processing according to some embodiments of the present disclosure. In some embodiments, a process 300 may be performed by a processing device (e.g., the processing device 120). For example, the process 300 may be stored in a storage device (e.g., a built-in storage unit of the processing device or an external storage device) in the form of a program or an instruction, and may be implemented when the program or the instruction is executed. As shown in FIG. 3, the process 300 may include the following operations.

In 302, an initialization filtering scheme of an IIR filter may be obtained.

The initialization filtering scheme of the IIR filter may include but is not limited to one or more of zero initialization, step initialization, projection initialization, exponential initialization, etc. For example, the initialization filtering scheme may be a step initialization filtering scheme, or may be a step initialization filtering scheme and a projection initialization filtering scheme. When there are two or more initialization filtering schemes, the processing device may successively use different initialization schemes, which is equivalent to performing two initializations. For example, the processing device may first use the step initialization filtering scheme, and then use the projection initialization filtering scheme.

In some embodiments, the processing device may obtain the initialization filtering scheme based on the magnitude of a data length T. For example, when the data length T is relatively large, e.g., when the data length T is greater than a certain threshold (e.g., 200), the zero initialization may be selected. As another example, when the data length T is a certain length (e.g., less than the threshold 200), the step initialization or projection initialization may be selected. The initialization filtering scheme may be selected according to requirements for a calculation speed and the effect of the spectrum image. The calculation speed of the step initialization may be higher than that of the projection initialization, and the effect of the spectrum image of the projection initialization may be higher than that of the step initialization. When a high calculation speed is required, the step initialization may be selected. When a high image quality is required, the projection initialization may be selected. In some embodiments, the step initialization and projection initialization may be arbitrarily selected.

In some embodiments, the processing device may obtain a sweep speed, and determine the initialization filtering scheme of the IIR filter based on the sweep speed. The sweep speed may be understood as a length of a time axis of a spectrum image displayed to a user. For example, assuming that a size of a screen currently displayed on a display screen is 700*200, 700 means 700 pixel units, and 200 means 200 pixel units. When the spectrum image is displayed, the size of the display screen may be constantly 700*200. An abscissa of the spectrum image is the time axis, and an ordinate of the spectrum image is the speed (the speed corresponds to a frequency after the Fourier transform of the signal, and the higher the frequency, the greater the speed). Assuming that the time axis of the abscissa is 1s, the processing device may need to process 700*200 pixel values in 1s. Assuming that the time axis of the abscissa is 2s, the processing device may need to process 700*200 pixel values in 2s. In some embodiments, the sweep speed may be represented by the length of the time axis of the abscissa of the spectrum image, e.g., the sweep speed may be represented by 2s, 3s, 6s, 12s, etc. The smaller the sweep speed, the higher the speed requirement for the calculation of the computing device, and the shorter the calculation time of the initialization filtering scheme of the IIR filter.

In the plurality of initialization filtering schemes of the IIR filter, different initialization schemes may have different calculation times. For example, the calculation time of zero initialization filtering may be relatively short, and the calculation time of projection initialization filtering may be relatively long. The processing device may select a corresponding initialization scheme based on the sweep speed. Merely by way of example, the greater the sweep speed, the faster the calculation speed is required, and the shorter the calculation time for the initialization filtering scheme is required. For example, when the sweep speed is 1s, the zero initialization may be selected, and when the sweep speed is 6s, the step initialization may be selected, etc. In some embodiments, the processing device 120 may determine a final initialization scheme according to a comparison between an actual sweep speed and a preset speed threshold.

In some embodiments, the processing device 120 may determine a target initialization scheme from a plurality of candidate initialization schemes as the initialization filtering scheme of the IIR filter. The candidate initialization schemes may be preset optional initialization schemes. For example, the plurality of candidate initialization schemes may include zero initialization, step initialization, projection initialization, and exponential initialization. The candidate initialization schemes may also be the embodiments of using different parameters in an initialization model. For example, the plurality of candidate initialization schemes may include initialization embodied when projection initialization adopts a first cutoff frequency, and initialization embodied when projection initialization adopts a second cutoff frequency. The target initialization scheme may refer to an initialization scheme selected from the plurality of candidate initialization schemes, and also be an initialization scheme for performing subsequent operations.

In some embodiments, a calculation time of the target initialization scheme may be related to the sweep speed. For example, a longer calculation time may correspond to a faster sweep speed. In some embodiments, during an ultrasonic imaging process, the sweep speed may be changed according to user input, and then the initialization scheme of the IIR filter may be adjusted accordingly.

In some embodiments, the processing device 120 may also determine the initialization filtering scheme of the IIR filter based on a size of a distribution interval between the two adjacent pulse Doppler echo signals in the time domain. In some embodiments, the size of the distribution interval between the two adjacent pulse Doppler echo signals in the time domain may reflect the missing of data between the two adjacent signals to a certain extent. For example, a larger interval indicates more data that may be missing. In some embodiments, the size of the distribution interval may be related to the calculation time corresponding to the initialization filtering scheme. For example, the larger the interval, the faster the calculation speed of the initialization filtering scheme. The more missing data, the more time is required for interpolation operation, requiring a faster calculation scheme to minimize the calculation time. Therefore, an initialization filtering scheme with a faster calculation speed may be selected to improve efficiency. In some embodiments, the size of the distribution interval may be represented using time. The longer the time interval between the two adjacent pulse Doppler echo signals, the larger the distribution interval, and the more missing Doppler echo signals in this part. For example, assuming that the time interval is 1s, it means that 1s of data may be missing between the two adjacent pulse Doppler echo signals, and assuming that the time interval is 2s, it means that 2s of data may be missing between the two adjacent pulse Doppler echo signals, and so on.

In some embodiments, the processing device 120 may also determine the initialization filtering scheme based on a data volume of each segment of IQ data. For example, assuming that the data volume of the IQ data is larger, on the one hand, since more data is processed, the dependence on the selection of the initialization scheme becomes smaller; on the other hand, since the data volume is larger and more data is processed, and a faster calculation speed is required. Therefore, the processing device may select an initialization filtering scheme with a faster calculation speed when the data volume is larger, and select an initialization filtering scheme with a better calculation effect when the data volume is small. The data volume of each segment of IQ data may be related to a frame rate displayed in other modes. The longer the IQ data, the lower the frame rate of the other modes in the two-synchronous or three-synchronous mode including PW. Therefore, the processing device 120 may determine the data volume of each segment of IQ data based on the frame rate displayed in the other modes. For example, a corresponding relationship between the frame rate of the other modes and the data volume of each segment of IQ data may be established in advance, the processing device may find the data volume corresponding to each segment of IQ data based on the frame rate of the other modes, then determine whether the data volume of each segment of IQ data exceeds a preset value, and determine the initialization filtering scheme according to a determination result.

Merely by way of example, when the data volume of each segment of IQ data is 64, the projection initialization filtering scheme may be selected; when the data volume of each segment of IQ data is 108, the step initialization filtering scheme may be selected; and when the data volume of each segment of IQ data is 128, the zero initialization filtering scheme may be selected. In some embodiments, the processing device 120 may determine the final initialization scheme according to a comparison between an actual IQ data volume and a preset data volume threshold. For example, the preset data volume threshold may include a plurality of values, such as 32, 64, and 128 (respectively represented by first, second, and third data volume thresholds, etc.), etc. When the IQ data volume does not exceed the first data volume threshold, the projection initialization filtering scheme may be selected. When the IQ data volume exceeds the first data volume threshold but not exceeds the second data volume threshold, the step initialization filtering scheme may be selected.

For FIR filtering, the initialization means discarding a length of data corresponding to an order, which is not repeated in the present disclosure.

In 304, a filter matrix may be generated according to the initialization filtering scheme of the IIR filter and the data length T.

In some embodiments, when the initialization filtering scheme of the IIR filter and the data length T are given, the filter matrix may be calculated according to the initialization filtering scheme and the data length T.

In some embodiments, the processing device may calculate the filter matrix based on the initialization filtering scheme and the data length T through a state-space method. In the state-space method, a relationship between an input and a filtered output of the IIR filter may be expressed by the following formula (4):

$$Y_k(n) = g^d v(n) + b_0 * X_k, \qquad (4)$$

where v(n) represents the filter matrix of the IIR filter in a state-space, which may be expressed as a vector sum of a plurality of basis functions. d is an order of the matrix g, which may be related to the data length T. For example, d may be equal to the data length T; the matrix g may be related to coefficients of an m-order IIR filter, which may be expressed by the following formula (5):

$$g(m) = b_m - b_0 * a_m, \qquad (5)$$

where g(m) represents the matrix g in formula (4), $a_m$ and $b_m$ represent the coefficients of the filter, and $b_0$ represents $b_m$ (when m=0), which is also the coefficient of the filter.

For example, the processing device may generate the filter matrix according to the coefficients a and b of the IIR filter through the following process.

First, parameter matrices F, q, g, and I may be generated, and then matrices B, C may be calculated:

$$F = \begin{bmatrix} 0 & 1 & 0 & \cdots & 0 \\ 0 & 0 & 1 & \cdots & 0 \\ \vdots & \vdots & \vdots & & \vdots \\ 0 & 0 & 0 & \cdots & 1 \\ -a_k & -a_{k-1} & -a_{k-2} & \cdots & -a_1 \end{bmatrix}, \qquad (6)$$

$$B = [g^T \quad g^T F \quad \cdots \quad g^T F^{N-1}]^T, \qquad (7)$$

$$C = \begin{bmatrix} b_0 & 0 & 0 & \cdots & 0 \\ 0 & b_0 & 0 & \cdots & 0 \\ \vdots & \vdots & \vdots & & \vdots \\ 0 & 0 & 0 & \cdots & 1 \\ g^T F^{N-2} q & g^T F^{N-3} q & g^T F^{N-4} q & \cdots & b_0 \end{bmatrix}, \qquad (8)$$

where $q=[0\ 0\ \ldots\ 1]^T$, and g may be obtained according to the formula (5).

Under the zero initialization, the filter matrix is C, under the step initialization, the filter matrix is $(B(I-F)^{-1}ql+C)$, and under the projection initialization, the filter matrix is $(I-B(B^TB)^{-1}B^T)C$.

The principle of the initialization filtering scheme is to decompose v(n) in different state-spaces and make n=0. After the filter initialization scheme and the data length T are given, the IIR filter may directly generate the filter matrix. The specific process has been described in the relevant technologies, and will not be repeated here.

In 306, the filter matrix may be multiplied by the first T data points of the IQ data.

In some embodiments, the processing device may input the filter matrix and the first T data points of the IQ data into a matrix parallel multiplication unit for calculation. The matrix parallel multiplication unit may realize the multiplication of the filter matrix and the first T data points of the IQ data through parallel accelerated calculation, thereby improving the calculation efficiency.

In some embodiments, multiplying the filter matrix by the first T data points of the IQ data may be expressed by the following formula (9):

$$Y_T = traMat * X_T, \qquad (9)$$

where $Y_T$ denotes the filtered data with a length of T, traMat denotes the filter matrix, and $X_T$ denotes input data with a length of T.

Figure 6:
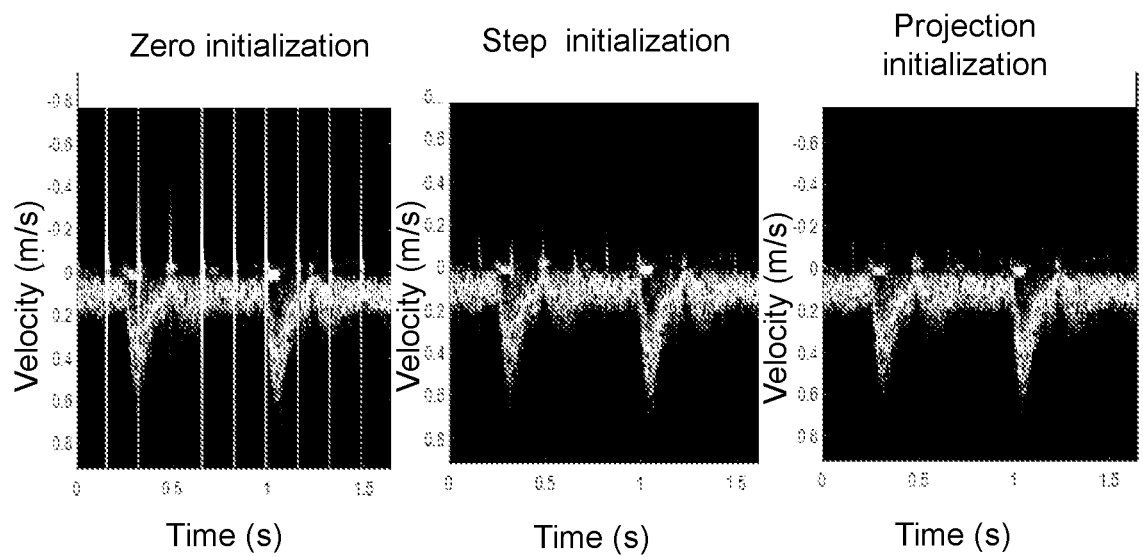
FIG. 6 is an IIR matrix filtering result under different initializations according to some embodiments of the present disclosure.

In some embodiments, when the selected data length T is equal to a length in a slow time direction of an entire PW echo signal, a relationship between the input signal and the filtered output signal may be expressed by matrix multiplication. Referring to FIG. 6, FIG. 6 illustrates IIR matrix filtering results under different initializations according to some embodiments of the present disclosure. Compared with the general IIR or the IIR filtering with initialization, the three initialization methods may have a certain improvement (the IIR filtering is a convolution operation, the initialization IIR is a matrix operation, and compared with the convolution operation, the matrix operation may be calculated in parallel, so the calculation speed may be faster) in calculation speed). Under the same dynamic range, the projection initialization yields minimal spectral line anomalies, so this method may balance the filtering quality and the calculation efficiency. For example, when a length n of the IQ data is long (e.g., n is 128, 256), a relatively good result can be achieved by using the zero initialization (when n is long, an effect of taking any data length T for segmental filtering may not be much different from the effect of directly performing integrated filtering on the IQ data of n length); when the length of the data gradually decreases, the transient effect may be weakened by using the step initialization or projection initialization.

In some embodiments, the larger the value of the data length T is selected, the smaller the effect of spectrum anomaly, but the matrix filter coefficient may also increase in square times. Therefore, in order to balance the calculation speed and the filtering effect, the value of the data length T may be set as a certain fixed ratio of the length of each segment of IQ data. For example, the ratio of T to n-T can be 2:1.

Figure 7:
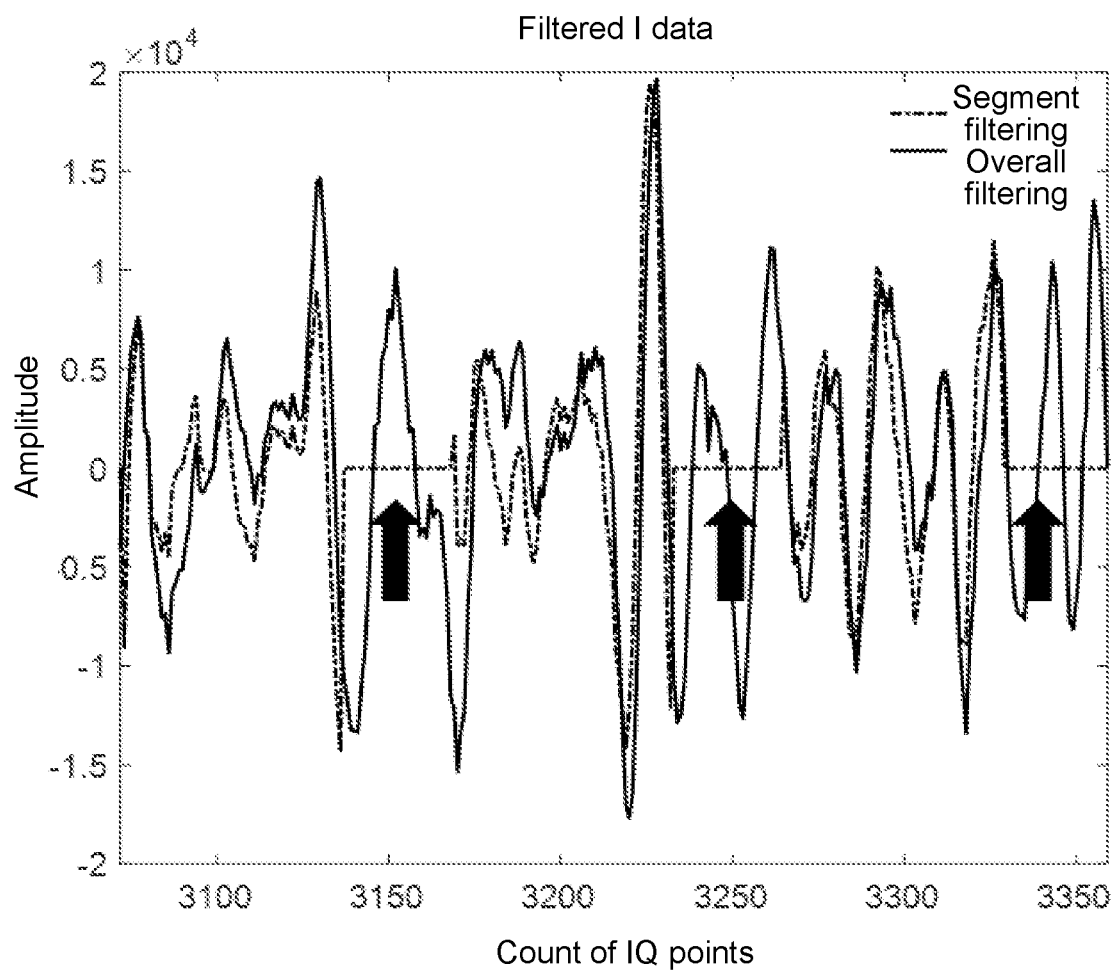
FIG. 7 is an exemplary diagram illustrating comparison of filtering results according to some embodiments of the present disclosure.

In some embodiments, in order to simulate the IQ data in the case of missing data points, the raw data may be grouped at a ratio of 2:1 (e.g., 64:32), the last 32 data points in each group may be replaced with 0 points to form "defective" data, and then segmental filtering may be performed on 64 data points of each group using the technical solutions disclosed in the present disclosure. Since a length of effective data is short, T may be set as a total length of each segment of data, i.e., T=64, then any initialization scheme may be selected for segmental filtering. The non-defective IQ data may be used as the raw data for overall filtering, and the comparison results of two filtering methods may be shown in FIG. 7. FIG. 7 is an exemplary diagram illustrating a comparison of filtering results according to some embodiments of the present disclosure. The segmental filtering in a dotted line represents a result after filtering using the technical solutions disclosed in the present disclosure. Taking the I data for comparison, an abscissa represents a count of data points of IQ data, an ordinate represents an amplitude value of the data, and an arrow represents missing data points. The solid line represents a filtering result in the case of no missing data, and the dotted line represents a filtering result in the case of missing data in a ratio of 2:1. If waveforms are relatively close, it means that the filtering result may still be good in the case of missing data. It can be seen from FIG. 7 that the waveforms of the IQ data after segmental filtering using the technical solutions disclosed in the present disclosure may be basically the same as the waveforms of filtering in the case of no missing data, and an error is 1-2 orders of magnitude less than the amplitude (in the position of no missing data, a ratio of a difference between a difference of the amplitude of the solid line and a difference of the amplitude of the dotted line to the amplitude of the solid line may be about 10%-1%), which is crucial for the subsequent interpolation of the IQ data.

The filtering solutions disclosed in the present disclosure may be applied to various digital filters, including but are not limited to the FIR filter and the IIR filter exemplified in the present disclosure, all of which may adopt the technical solutions disclosed in the present disclosure. For example, various low-pass filters and high-pass filters may adopt the segmental filtering method disclosed in the present disclosure, i.e., the first filtering may be performed on part of data points of each signal, and then the overall filtering may be performed on all the data points.

Figure 4:
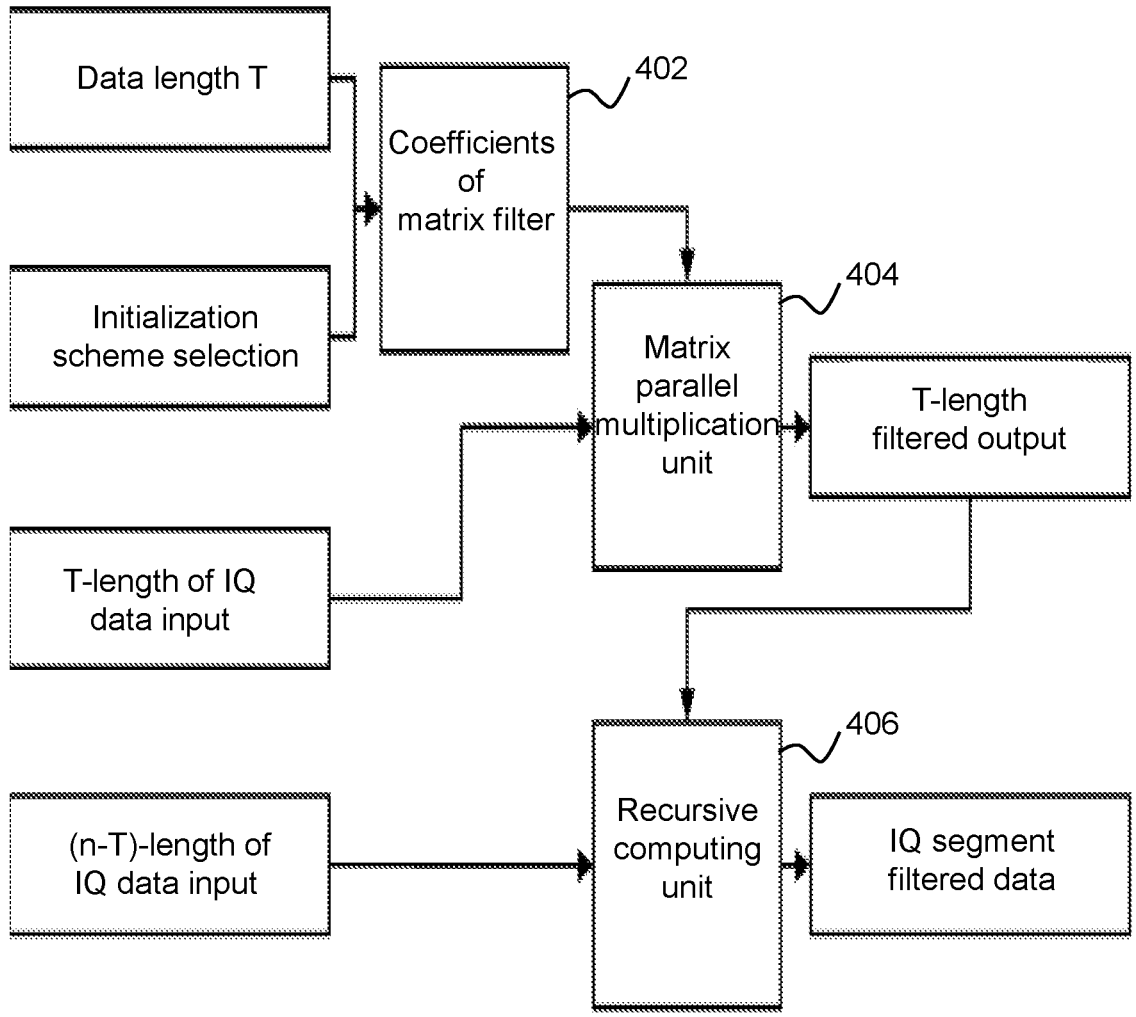
FIG. 4 is an exemplary schematic diagram illustrating a complete process of filtering processing for each segment of IQ data according to some embodiments of the present disclosure.

FIG. 4 is an exemplary schematic diagram illustrating a complete process of filtering processing for each segment of IQ data according to some embodiments of the present disclosure. In some embodiments, a process 400 may be performed by a processing device (e.g., the processing device 120). For example, the process 400 may be stored in a storage device (e.g., a built-in storage unit of the processing device or an external storage device) in the form of a program or an instruction, and may be implemented when the program or the instruction is executed. As shown in FIG. 4, the process 400 may include the following operations.

In 402, a filter matrix may be generated according to the initialization filtering scheme of the IIR filter and the data length T.

In 404, a T-length filtered output may be obtained by inputting and multiplying the filter matrix and the first T data points of the IQ data into a matrix parallel multiplication unit.

The T-length filtered output refers to filtered data with a length of T.

In 406, a segment of filtered IQ data may be obtained by performing recursive filtering by inputting the T-length filtered output and the unfiltered (n-T)-length data into a recursive computing unit.

The descriptions regarding each operation of the process may be found in the relevant descriptions in FIG. 2 and FIG. 3, which are not repeated here.

It should be noted that the above descriptions are for illustration and description only, and do not limit the scope of application of the present disclosure. For those skilled in the art, various modifications and variations may be made to each process under the guidance of the present disclosure. However, such modifications and variations (for example, variations to the operations of the relevant process in the present disclosure, such as adding a preprocessing operation and a storage operation, etc.) are still within the scope of the present disclosure.

Figure 5:
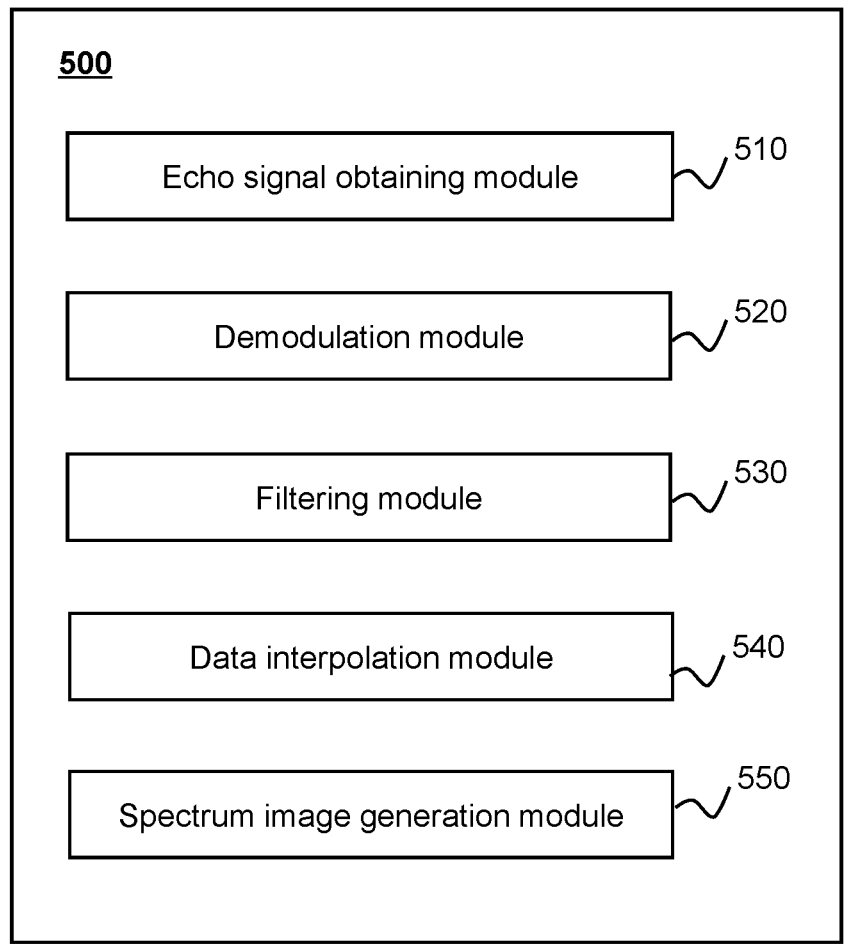
FIG. 5 is an exemplary module diagram illustrating a filtering system for ultrasonic imaging according to some embodiments of the present disclosure.

FIG. 5 is an exemplary module diagram illustrating a filtering system for ultrasonic imaging according to some embodiments of the present disclosure. As shown in FIG. 5, a system 500 may include an echo signal obtaining module 510, a demodulation module 520, a filtering module 530, a data interpolation module 540, and a spectrum image generation module 550.

The echo signal obtaining module 510 may be configured to obtain a plurality of pulse Doppler echo signals. Two adjacent pulse Doppler echo signals may be distributed at intervals in a time domain.

The demodulation module 520 may be configured to generate a plurality of discontinuous segments of IQ data by demodulating the plurality of pulse Doppler echo signals.

The filtering module 530 may be configured to perform filtering processing on each segment of IQ data. For each segment of IQ data, the filtering module 530 may perform filtering on at least part of data points and obtain a segment of filtered IQ data by performing recursive filtering on the filtered data points and the unfiltered data points. It should be noted that in some embodiments, the filtered IQ data may be IQ data obtained after a first filtering and/or a second filtering.

The data interpolation module 540 may be configured to perform interpolation based on the plurality of segments of filtered IQ data.

The spectrum image generation module 550 may be configured to generate a spectrum image based on the interpolated data.

The detailed descriptions regarding each module of the system may be found in the process part of the present disclosure (e.g., FIG. 2-FIG. 4), which are not repeated here.

It can be understood that the system and the modules thereof shown in FIG. 5 may be implemented in various ways. For example, in some embodiments, the system and the modules thereof may be implemented by hardware, software, or a combination of software and hardware. The hardware portion may be implemented by using a dedicated logic; and the software portion may then be stored in a storage and executed by a suitable instruction execution system, such as a microprocessor or specially designed hardware. Those skilled in the art may be noted that the methods and systems described above may be implemented using a computer-executable instruction and/or may be through a control code embodied in a processor, for example, on a carrier medium such as a hard disk, a magnetic disk, a CD, or a DVD-ROM, or such code is provided on a programmable memory of a ROM (firmware) or a data carrier such as an optical or electronic signal carrier. The system and the modules thereof in the present disclosure may not only be implemented by VLSIs or gate arrays, semiconductors such as logic chips, transistors, etc., or hardware circuits of programmable hardware devices such as field programmable gate arrays, programmable logic devices, etc., but also may be implemented by, for example, software executed by various types of processors, and may further be implemented by a combination of the above-described hardware circuits and software (e.g., firmware).

It should be noted that the above descriptions of the filtering system for ultrasonic imaging and the modules thereof are for convenience of description only, and do not limit the present disclosure to the scope of the embodiments. It can be understood that for those skilled in the art, after understanding the principle of the system, it is possible to combine various modules arbitrarily or form a subsystem to connect with other modules without departing from this principle. For example, in some embodiments, the echo signal obtaining module 510, the demodulation module 520, the filtering module 530, the data interpolation module 540, and the spectrum image generation module 550 may be different modules in one system, or one module may implement the functions of the above two or more modules. For example, two or more modules may share one storage module, or each module may have its own storage module. Such variations are within the protection scope of the present disclosure It should be noted that different embodiments may have different beneficial effects. In different embodiments, the possible beneficial effects may be any one or a combination of the above, or any other possible beneficial effects.

The basic concept has been described above. Obviously, for those skilled in the art, the above-detailed disclosure is only an example and does not constitute a limitation to the present disclosure. Although not expressly stated here, those skilled in the art may make various modifications, improvements, and corrections to the present disclosure. Such modifications, improvements, and corrections are suggested in this disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure, or characteristic related to at least one embodiment of the present disclosure. Therefore, it should be emphasized and noted that references to "one embodiment," "an embodiment" or "an alternative embodiment" two or more times in different places in the present disclosure do not necessarily refer to the same embodiment. In addition, certain features, structures, or characteristics in one or more embodiments of the present disclosure may be properly combined.

In addition, those skilled in the art will understand that various aspects of the present disclosure may be illustrated and described by several patentable categories or situations, including any new and useful combination of processes, machines, products, or substances, or any new and useful improvements thereon. Correspondingly, various aspects of the present disclosure may be entirely executed by hardware, may be entirely executed by software (including firmware, resident software, microcode, etc.), or may be executed by a combination of hardware and software. The above hardware or software can be referred to as "data block," "module," "engine," "unit," "component" or "system". Additionally, aspects of the present disclosure may be embodied as a computer product comprising computer-readable program codes on one or more computer-readable media.

The computer storage medium may contain a propagated data signal embodying a computer program code, for example, in a baseband or as part of a carrier wave. The propagated signal may have various manifestations, including an electromagnetic form, an optical form, etc., or a suitable combination. The computer storage medium may be any computer-readable medium, other than the computer-readable storage medium, that can be used to communicate, propagate, or transfer a program for use by being coupled to an instruction execution system, apparatus, or device. Program codes residing on the computer storage medium may be transmitted over any suitable medium, including radio, electrical cable, fiber optic cable, RF, or the like, or combinations of any of the foregoing.

The computer program codes required for the operation of each part of the present disclosure can be written in any one or more programming languages, including object-oriented programming languages such as Java, Scala, Smalltalk, Eiffel, JADE, Emerald, C++, C #, VB.NET, Python etc., conventional procedural programming languages such as C language, Visual Basic, Fortran 2003, Perl, COBOL 2002, PHP, ABAP, dynamic programming languages such as Python, Ruby and Groovy, or other programming languages, etc. The program codes may run entirely on the user's computer, or as a stand-alone software package, or run partly on the user's computer and partly on a remote computer, or entirely on the remote computer or server. In the latter case, the remote computer may be connected to the user computer through any form of network, such as a local area network (LAN) or wide area network (WAN), or to an external computer (such as through the Internet), or in a cloud computing environment, or as a service use software as a service (Saas).

In addition, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about," "approximately," or "substantially" in some examples. Unless otherwise stated, "about," "approximately," or "substantially" indicates that the number is allowed to vary by +20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A filtering method for ultrasonic imaging, comprising:
    obtaining a plurality of pulse Doppler echo signals, two adjacent pulse Doppler echo signals being distributed at intervals in a time domain;
    generating a plurality of discontinuous segments of IQ data by demodulating the plurality of pulse Doppler echo signals;
    for each segment of IQ data:
        performing first filtering on at least part of data points, and
        obtaining a segment of filtered IQ data by performing second filtering on the filtered data points and unfiltered data points; and
    generating a spectrum image based on a plurality of segments of filtered IQ data.

2. The method of claim 1, wherein for each segment of IQ data, the performing first filtering on at least part of data points includes:
    obtaining a data length T; and
    performing filtering on first T data points of the IQ data.

3. The method of claim 2, wherein the performing filtering on first T data points of the IQ data includes:
    obtaining an initialization filtering scheme of an infinite impulse response (IIR) filter;
    generating a filter matrix according to the initialization filtering scheme of the IIR filter and the data length T; and
    multiplying the filter matrix by the first T data points of the IQ data.

4. The method of claim 3, wherein the obtaining an initialization filtering scheme of an IIR filter includes:
    obtaining a sweep speed; and
    determining the initialization filtering scheme of the IIR filter based on the sweep speed.

5. The method of claim 4, wherein the determining the initialization filtering scheme of the IIR filter based on the sweep speed includes:
    determining a target initialization scheme from a plurality of candidate initialization schemes as the initialization filtering scheme of the IIR filter, wherein a calculation time of the target initialization scheme is related to the sweep speed.

6. The method of claim 3, wherein the obtaining an initialization filtering scheme of an IIR filter includes:
    determining the initialization filtering scheme of the IIR filter based on a size of a distribution interval of the two adjacent pulse Doppler echo signals in the time domain.

7. The method of claim 3, wherein the multiplying the filter matrix by the first T data points of the IQ data is implemented through parallel computing.

8. The method of claim 3, wherein the initialization filtering scheme of the IIR filter includes one or more of zero initialization, step initialization, projection initialization, and exponential initialization.

9. The method of claim 3, wherein the performing second filtering on the filtered data points and unfiltered data points includes:
    performing IIR filtering by successively inputting the filtered data points and the unfiltered data points into the IIR filter.

10. The method of claim 2, wherein the data length T is less than or equal to a length of each segment of IQ data.

11. The method of claim 1, wherein the generating the spectrum image based on a plurality of segments of filtered IQ data includes:
    performing interpolation on the plurality of segments of filtered IQ data; and
    generating the spectrum image based on the interpolated data.

12. The method of claim 1, wherein the two adjacent pulse Doppler echo signals are respectively generated by two PW emission sequences, and a B sequence or a C sequence is inserted between the two PW emission sequences.

13. A filtering system for ultrasonic imaging, comprising:
    an echo signal obtaining module configured to obtain a plurality of pulse Doppler echo signals, two adjacent pulse Doppler echo signals being distributed at intervals in a time domain;
    a demodulation module configured to generate a plurality of discontinuous segments of IQ data by demodulating the plurality of pulse Doppler echo signals; and
    a filtering module configured to: for each segment of IQ data, perform first filtering on at least part of data points; and
        obtain a segment of filtered IQ data by performing second filtering on the filtered data points and unfiltered data points.

14. The system of claim 13, wherein to perform the first filtering on the at least part of data points, the filtering module is configured to:
    obtain a data length T; and
    performing filtering on first T data points of the IQ data.

15. The system of claim 14, wherein the filtering module is further configured to:
    obtain an initialization filtering scheme of an infinite impulse response (IIR) filter;
    generate a filter matrix according to the initialization filtering scheme of the IIR filter and the data length T; and
    multiply the filter matrix by the first T data points of the IQ data.

16. The system of claim 15, wherein the filtering module is further configured to:
    obtain a sweep speed; and
    determine the initialization filtering scheme of the IIR filter based on the sweep speed.

17. The system of claim 15, wherein the filtering module is further configured to:
    determine the initialization filtering scheme of the IIR filter based on a size of a distribution interval of the two adjacent pulse Doppler echo signals in the time domain.

18. The system of claim 15, wherein the multiplying the filter matrix by the first T data points of the IQ data is implemented through parallel computing.

19. The system of claim 13, wherein the two adjacent pulse Doppler echo signals are respectively generated by two PW emission sequences, and a B sequence or a C sequence is inserted between the two PW emission sequences.

20. A filtering device for ultrasonic imaging, comprising at least one non-transitory storage medium and at least one processor, wherein the at least one non-transitory storage medium is configured to store computer instructions; and the at least one processor is configured to execute the computer instructions to implement a method including:
- obtaining a plurality of pulse Doppler echo signals, two adjacent pulse Doppler echo signals being distributed at intervals in a time domain;
- generating a plurality of discontinuous segments of IQ data by demodulating the plurality of pulse Doppler echo signals;
- for each segment of IQ data:
  - performing first filtering on at least part of data points; and
  - obtaining a segment of filtered IQ data by performing second filtering on the filtered data points and unfiltered data points, and
- generating a spectrum image based on a plurality of segments of filtered IQ data.

* * * * *